United States Patent
Kerselaers et al.

(10) Patent No.: US 11,031,680 B2
(45) Date of Patent: Jun. 8, 2021

(54) NEAR-FIELD ELECTROMAGNETIC INDUCTION (NFEMI) ANTENNA

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 104 days.

(21) Appl. No.: 16/150,015

(22) Filed: Oct. 2, 2018

(65) Prior Publication Data

US 2020/0106170 A1  Apr. 2, 2020

(51) Int. Cl.
*H01Q 1/27* (2006.01)
*H01Q 7/06* (2006.01)
*H04B 13/00* (2006.01)

(52) U.S. Cl.
CPC .............. *H01Q 1/273* (2013.01); *H01Q 7/06* (2013.01); *H04B 13/005* (2013.01)

(58) Field of Classification Search
CPC ........ H01Q 1/273; H01Q 7/06; H04B 13/005; H04B 5/0075; H04B 5/06; H04B 5/0012; H04R 25/00; H04R 1/10
See application file for complete search history.

(56) References Cited

U.S. PATENT DOCUMENTS

| | | |
|---|---|---|
| 3,963,990 A | 6/1976 | DiFonzo |
| 4,849,685 A | 7/1989 | Nave |
| 5,017,878 A | 5/1991 | Nave |
| 6,717,485 B2 | 4/2004 | Kolb et al. |
| 7,742,614 B2 | 6/2010 | Christensen et al. |
| 8,125,291 B2 | 2/2012 | Wang et al. |
| 8,970,378 B2 | 3/2015 | Deavours et al. |
| 9,106,328 B2 | 8/2015 | Kataoka et al. |
| 9,197,986 B1 | 11/2015 | Kerselaers et al. |
| 9,390,603 B2 | 7/2016 | Li et al. |
| 9,577,348 B2 | 2/2017 | Gomme et al. |
| 9,819,097 B2 | 11/2017 | Kerselaers et al. |
| 9,866,282 B2 | 1/2018 | Hirsch et al. |
| 9,866,966 B2 | 1/2018 | Lott |
| 9,941,981 B2 | 4/2018 | Linnartz |
| 10,200,092 B1 | 2/2019 | Irci et al. |
| 2010/0279734 A1 | 11/2010 | Karkinen et al. |
| 2010/0309080 A1 | 12/2010 | Minemura et al. |
| 2014/0177863 A1 | 6/2014 | Parkins |
| 2015/0249485 A1 | 9/2015 | Ouyang et al. |

(Continued)

FOREIGN PATENT DOCUMENTS

| | | | |
|---|---|---|---|
| EP | 2458674 A2 * | 5/2012 | ............... H01Q 1/36 |
| EP | 2458674 A3 | 5/2012 | |
| WO | WO-2013/147823 A1 | 10/2013 | |

OTHER PUBLICATIONS

U.S. Appl. No. 16/380,303; not yet published; 32 pages (filed Apr. 10, 2019).

(Continued)

*Primary Examiner* — Awat M Salih

(57) ABSTRACT

One example discloses a near-field electromagnetic induction (NFEMI) device configured to be coupled to a non-planar conductive host surface, including: a coil antenna portion configured as a magnetic field antenna; and a conductive antenna surface configured as an electric field antenna; wherein the conductive antenna surface geometrically conforms to the non-planar host surface.

20 Claims, 6 Drawing Sheets

(56) References Cited

U.S. PATENT DOCUMENTS

| | | |
|---|---|---|
| 2016/0029955 A1 | 2/2016 | Sato |
| 2016/0344109 A1* | 11/2016 | Gomme .................. H01Q 5/40 |
| 2017/0062913 A1 | 3/2017 | Hirsch et al. |
| 2017/0062949 A1* | 3/2017 | Kerselaers ............. H01Q 1/273 |
| 2017/0180844 A1* | 6/2017 | Nanni ..................... H01Q 1/48 |
| 2017/0263376 A1 | 9/2017 | Verschueren et al. |
| 2017/0288731 A1 | 10/2017 | Kerselaers |
| 2017/0324170 A1 | 11/2017 | Kerselaers et al. |
| 2018/0241116 A1 | 8/2018 | Kerselaers et al. |
| 2019/0103661 A1* | 4/2019 | Cousins .................. H01Q 9/42 |
| 2019/0341678 A1 | 11/2019 | Gomme et al. |
| 2020/0028246 A1* | 1/2020 | Kim .................... H04R 1/1016 |

OTHER PUBLICATIONS

U.S. Appl. No. 16/504,562; not yet published; 36 pages (filed Jul. 8, 2019).

U.S. Appl. No. 15/972,614; not yet published; 29 pages (filed May 7, 2018).

Notice of Allowance; U.S. Appl. No. 16/380,303; 7 pages (dated Aug. 24, 2020).

Final Office Action; U.S. Appl. No. 16/150,015; 22 pages (dated Oct. 6, 2020).

Non Final Office Action; U.S. Appl. No. 16/504,562; 16 pages (dated Feb. 8, 2021).

\* cited by examiner

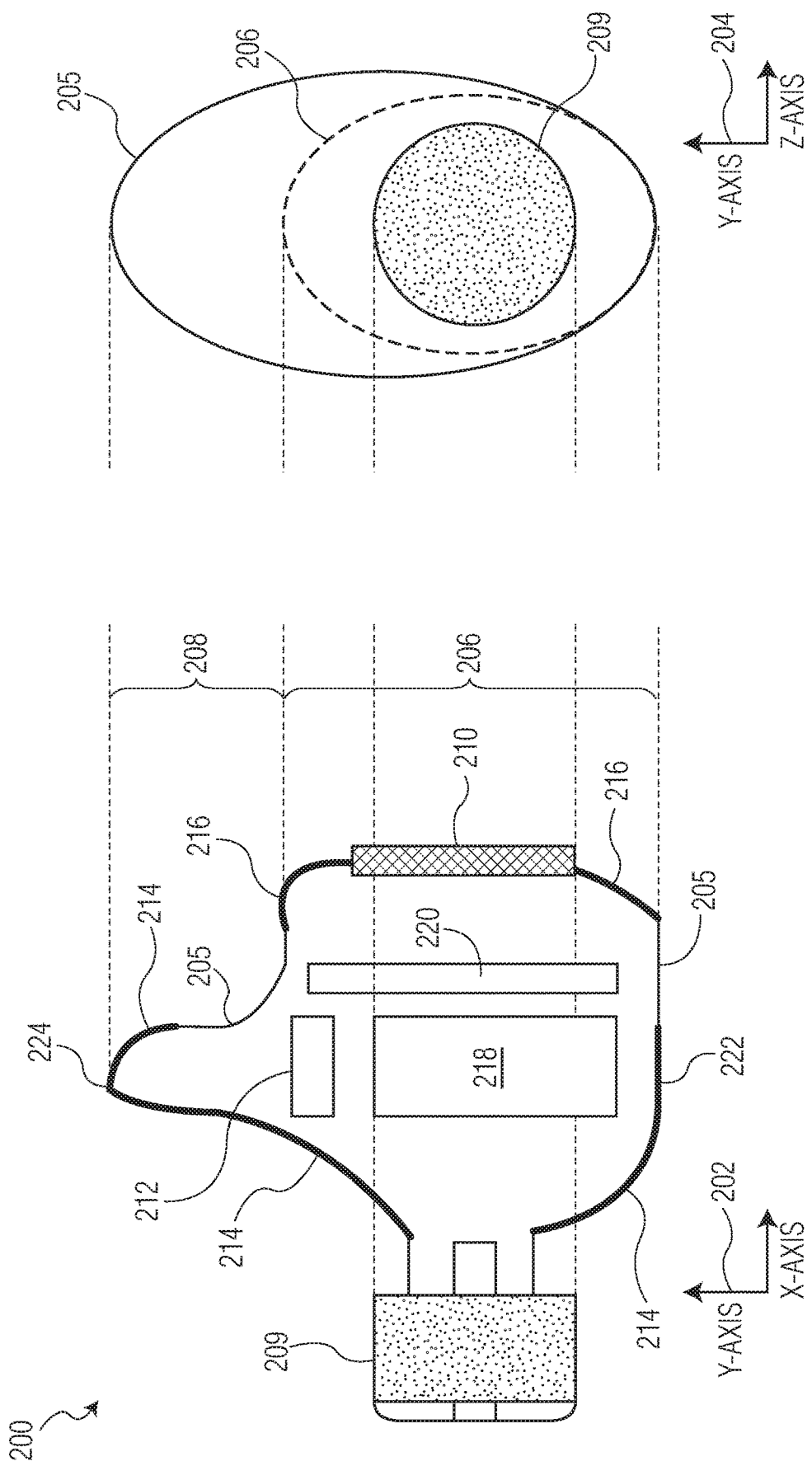

NEAR-FIELD ELECTROMAGNETIC INDUCTION (NFEMI) ANTENNA

The present specification relates to systems, methods, apparatuses, devices, articles of manufacture and instructions for near-field electromagnetic induction (NFEMI) antennas.

SUMMARY

According to an example embodiment, a near-field electromagnetic induction (NFEMI) device configured to be coupled to a non-planar conductive host surface, comprising: a coil antenna portion configured as a magnetic field antenna; and a conductive antenna surface configured as an electric field antenna; wherein the conductive antenna surface geometrically conforms to the non-planar host surface.

In another example embodiment, the geometrical conforming of the conductive antenna surface is configured to increase a capacitance of the electric field antenna which increases a signal strength of the NFEMI antenna.

In another example embodiment, the non-planar host surface is a human body surface.

In another example embodiment, the non-planar host surface is an ear surface.

In another example embodiment, an entire surface area of the conductive antenna surface conforms to the non-planar host surface.

In another example embodiment, the conductive antenna surface is rigid.

In another example embodiment, the conductive antenna surface is configured to be in direct galvanic contact with the non-planar host surface.

In another example embodiment, the device is embedded in an earbud and the conductive antenna surface forms an outside surface of the earbud.

In another example embodiment, further comprising a thin dielectric layer; wherein one side of the thin dielectric layer is coupled to the conductive antenna surface and an opposite side to the one side is configured to be in direct contact with the non-planar host surface.

In another example embodiment, further comprising a second conductive antenna surface configured as part of the electric field antenna.

In another example embodiment, the conductive antenna surfaces are substantially centered about an axis perpendicular to the non-planar surface.

In another example embodiment, the conductive antenna surfaces are substantially diagonal to an axis perpendicular to the non-planar surface.

In another example embodiment, the conductive antenna surface is coupled to a first location on the device and the second conductive antenna surface is coupled to a second location on the device.

In another example embodiment, the first location and the second location are separated by a longest possible distance on the device.

In another example embodiment, the second conductive antenna surface is planar.

In another example embodiment, the second conductive antenna surface does not geometrically conform to the non-planar surface.

In another example embodiment, further comprising a user interface.

In another example embodiment, the second conductive antenna surface encircles the user interface.

In another example embodiment, an increase in the distance between the conductive antenna surface and the second conductive antenna surface is configured to increase a signal strength of the NFEMI antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

BRIEF DESCRIPTION OF THE DRAWINGS

FIGS. 2A and 2B show a first example wireless device including an NFEMI antenna.

Figure 1A:
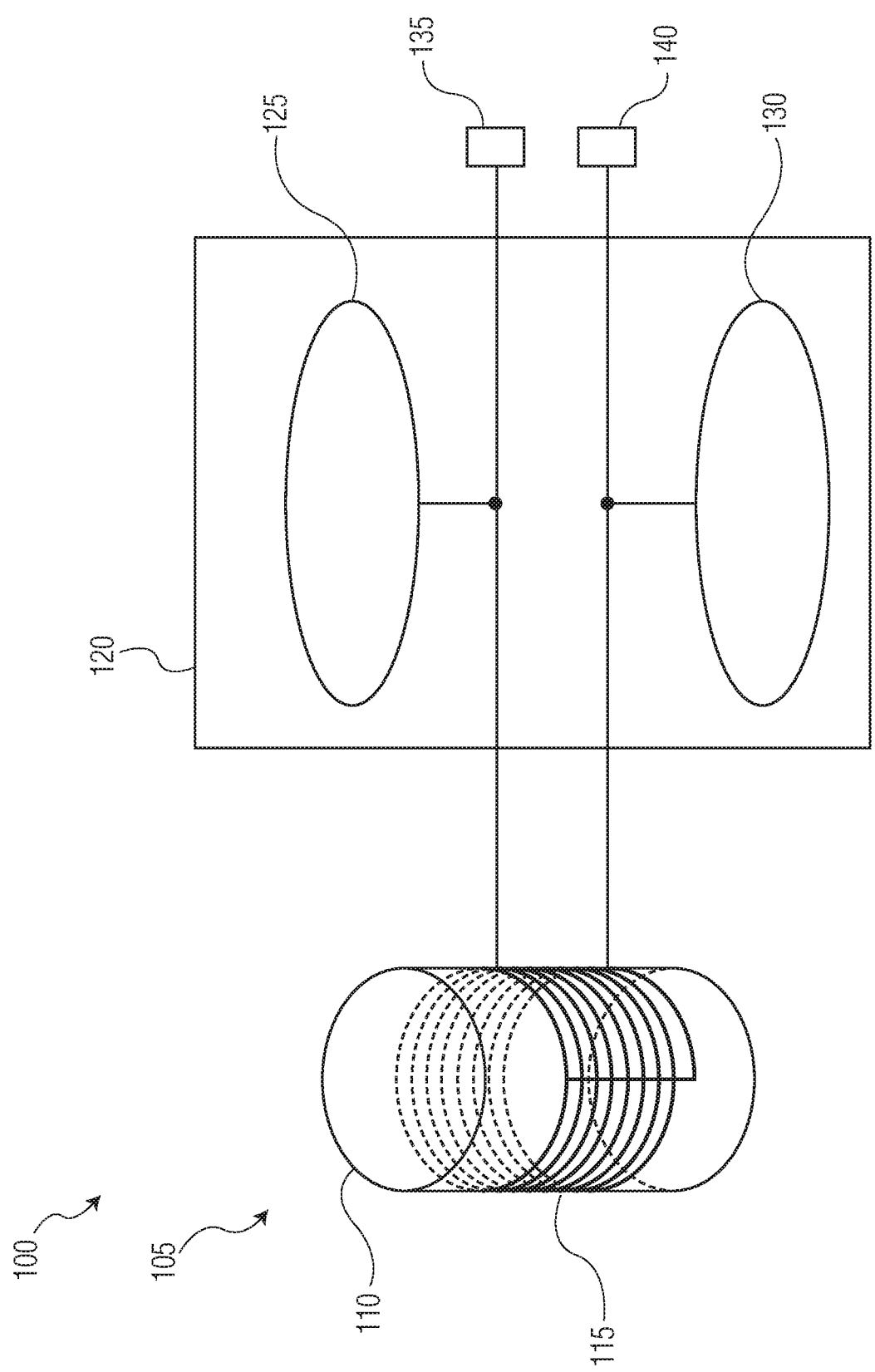
FIG. 1A is an example near-field electromagnetic induction (NFEMI) antenna for use in a wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

FIG. 1A is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include a first conductive antenna surface 125 and a second conductive antenna surface 130. Antenna 100 feed points 135, 140 are coupled to various transceiver circuitry, such as downstream radio transmitter and receiver integrated circuit (RF-IC), (not shown here). The antenna 100 bandwidth and resonance frequency can be tuned using reactance components (e.g. capacitive and resistive banks) that are integrated in the radio IC.

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Figure 1B:
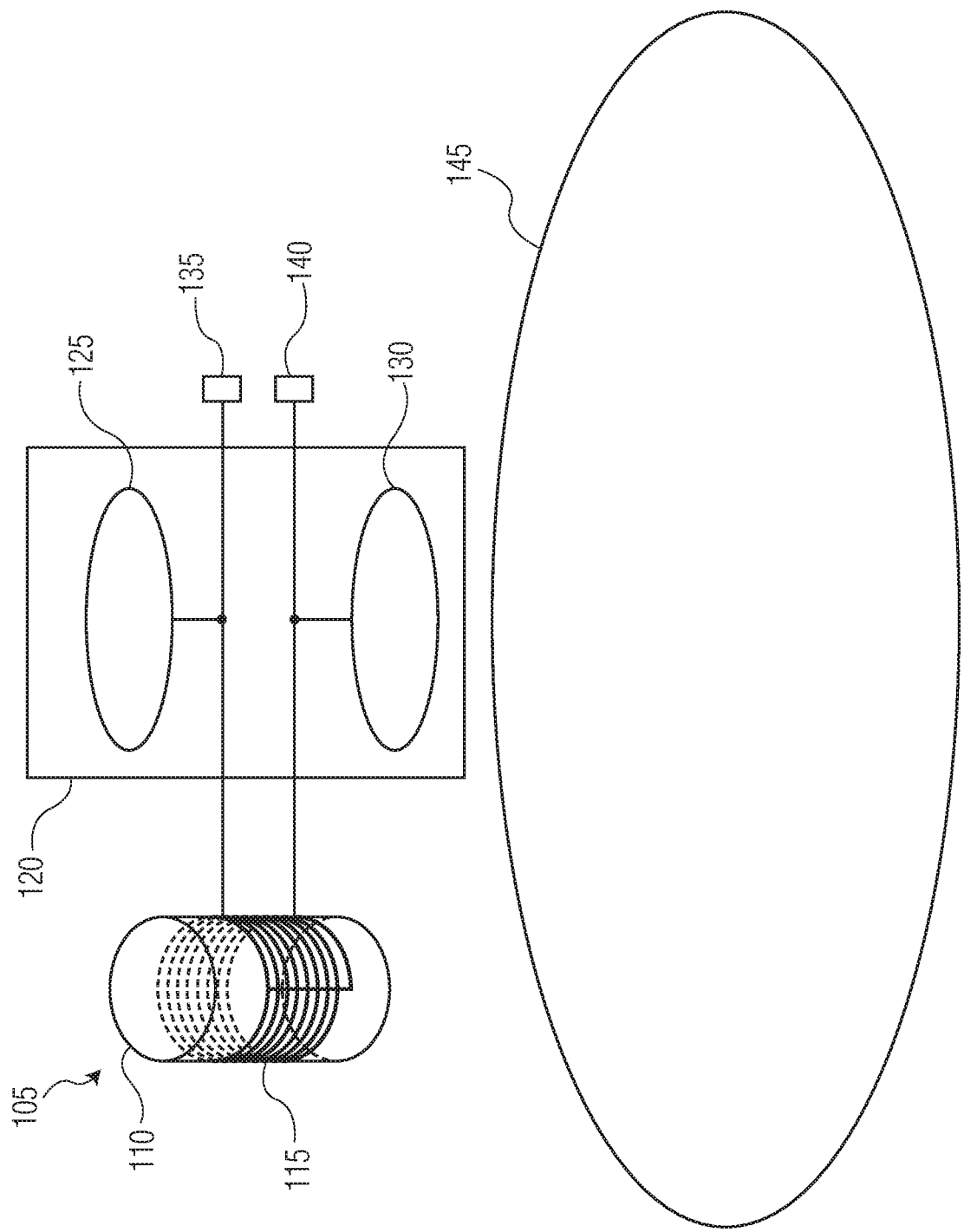
FIG. 1B is an example of the near-field electromagnetic induction (NFEMI) antenna 100 proximate to a conductive host surface.

FIG. 1B is an example of the near-field electromagnetic induction (NFEMI) antenna 100 proximate to a conductive host surface 145. The conductive host surface 145 in various example embodiments can be a human body, a body surface, an ear canal, a nose orifice, a mouth, or a conductive structure of any type.

Near-field signals from the antenna 100 are confined near the conductive host surface 145 in transmit mode, and confined by the conductive host surface 145 in receive mode. In one example embodiment, the near-field frequencies are kept below 50 MHz to ensure that the near-field signals follow the conductive host surface's 145 contours and only a little far field radiation is radiated. The antenna's 100 physical dimensions are much smaller than the antenna's 100 communication wavelength.

The first and second conductive antenna surfaces 125, 130 are positioned close to the conductive host surface 145. In some example embodiments, the second conductive antenna surface 130 is positioned close to the conductive host surface 145 (e.g. the skin of a human body) and the first conductive antenna surface 125 is positioned further away.

In some applications, the NFEMI antenna 100 can be positioned close to the conductive host surface 145 (e.g. an NFEMI antenna 100 in a smartwatch). However, in other applications the NFEMI antenna 100 may be partially or completely covered, such as when in an earbud placed in a user's ear canal.

Now discussed are example embodiments of NFEMI devices that in some example embodiments are partially or wholly inside of a non-planar conductive host surface (e.g. a body region such as a user's ear canal). One of the technical effects of the NFEMI devices, now to be discussed, is a stronger and more robust communication signal even when the NFEMI device is partially or wholly inside of a host surface. In some example embodiments this technical effect is achieved by placing a first conductive structure for an E-field signal as close to the host surface as possible and placing a second conductive structure at a maximum separation from the first conductive structure as to further increase a communication link budget.

FIGS. 2A and 2B show a first example wireless device 200 including an NFEMI antenna. In this example embodiment, the wireless device 200 is an earbud that in use may be partially or completely covered, such as when in an earbud placed in a user's ear canal. FIG. 2A is an example side view 202 of the wireless device 200 and FIG. 2B is an example axial view 204 (i.e. facing a side to be inserted in an ear canal) of the wireless device 200.

The device 200 includes a non-planar outer surface 205 having a core region 206 and an extension region 208, a loudspeaker 209, a user interface 210, a coil antenna 212 (i.e. magnetic H-Field antenna), a first conductive antenna surface 214 (i.e. electric E-Field antenna), a second conductive antenna surface 216 (i.e. electric E-Field antenna), a battery 218 and electronic circuitry 220.

The core region 206 is this example houses various functional components as shown in FIG. 2A. The extension region 208 defines part of the non-planar outer surface 205 of the wireless device 200 and is contoured to snugly fit the non-planar surface of a host conductive surface (e.g. a user's ear, so as to provide a stable positioning of an earbud embodiment of the wireless device 200).

In some example embodiments, the loudspeaker 209 is configured to be inserted in a user's ear canal. The user interface 210 enables control of the wireless device 200 (e.g. controlling different functionalities of the earbud) and may include switches, proximity, and/or optoelectronics responsive to touch and/or gestures from a user.

Some example embodiments of the coil antenna 212 include a core and wire windings, where the core is a ferrite material with dimensions of 2 mm diameter and 6 mm length) and there are at least 20 wire windings.

In some example embodiments, the first conductive antenna surface 214 includes a lower portion 222 inside of the wireless device 200 near the battery and an upper portion 224 that is closer to the outer surface of the wireless device 200. The second conductive antenna surface 216 in some examples encircles the user interface 210, while in other examples may have a planar portions that continues on behind or in front of the user interface 210. In some example embodiments the first and second conductive antenna surfaces 214, 216 are flexible metal foils, in other example embodiments the first and second conductive antenna surfaces 214, 216 are conductive paints.

The battery 218 supplies power to the electronic circuitry 220, and may be chargeable or replaceable. The electronic circuitry 220 in various example embodiments includes transceiver circuitry, a receiver integrated circuit (RF-IC), and reactance components (e.g. capacitive and resistive banks). The reactance components (e.g. capacitive and resistive banks) adjust a bandwidth and resonance frequency of the device 200. The electronic circuitry 220 may be coupled to a substrate/carrier. The carrier may be a printed circuit board or any flexible material suitable to hold the electronic circuitry 220 and any mechanic components enabling the functioning of the earbud.

A voltage transmitted and/or received by the NFEMI antenna of the wireless device 200 is a combination of voltages due to both the magnetic H-Field and the electric E-Field.

The received magnetic H-Field voltage is defined by:

$$V_{rx,coil}(x) = Q2\pi NS\mu_0\mu_r H(x)F$$

Where:
Q=quality factor of tuned antenna
N=the number of turns of the coil
F=communication frequency
S=surface of the coil core
H(x)=the magnetic field at the receive coil position
$\mu_0 = 4\cdot p \cdot 10^{-7}$ H/m is magnetic permeability of vacuum
$\mu_r$=relative magnetic permeability of the core of the coil The voltage received by the antenna from the electric E-Field is defined by:

$$V_{rx,dipole}(x) = E(x)dQ \frac{C_a}{\varepsilon_r(C_a + C_{Tune})}$$

Where:
Q=quality factor of tuned antenna
d=distance between the conducting surfaces
E(x)=the electric field at the receive antenna
$\varepsilon_r$=relative electric permittivity of the substrate between the first and second conducting surface
$C_a$=antenna capacitance
$C_{Tune}$=tuning capacitor to tune the antenna to the communication frequency From the above formula, the received signal strength (i.e. Vrx) from the electric field will be increased when the antenna capacitance (Ca) increases and/or the distance between the conducting surfaces (d) increases.

By geometrically conforming the first conductive antenna surface 214 to a host surface (e.g. a user's ear canal), the antenna capacitance (Ca) is increased. Thus the shape of the extension region 208 by conforming to a user's outer ear and the shape of the portion of the core region 206 next to the loudspeaker 209 conforming to a user's inner ear, increases the NFEMI antenna's capacitance (Ca) and a larger electrical field is generated.

So even though direct E-Field generation by the first conductive antenna surface 214 is blocked by the inner ear, the large capacitance (Ca) enables the host conductive surface (e.g. a user's body) to indirectly transmit the first conductive antenna surface's 214 E-Field.

Also, by maximizing the distance (d) between the first conductive antenna surface 214 and the second conductive antenna surface 216, a larger electrical field is generated and Vrx further increases.

Using both of these techniques, a robustness of the NFEMI communications is achieved.

Figure 3B:
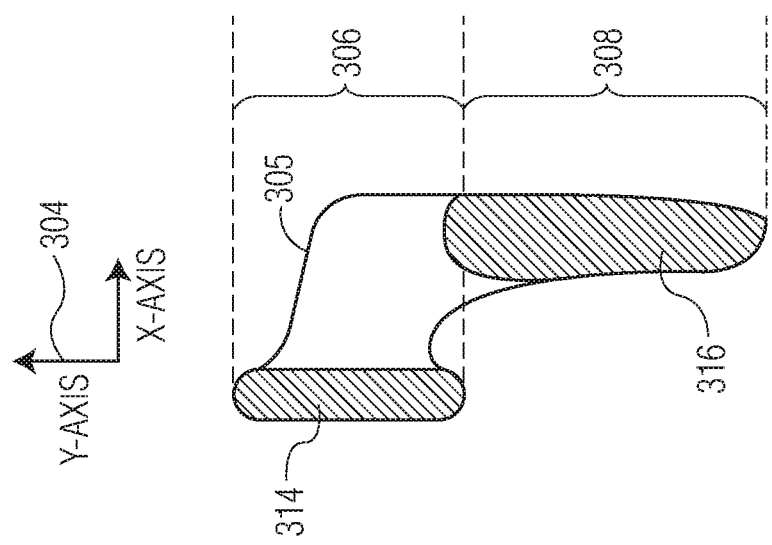
FIGS. 3A and 3B show a second example wireless device including an NFEMI antenna.
Figure 3A:
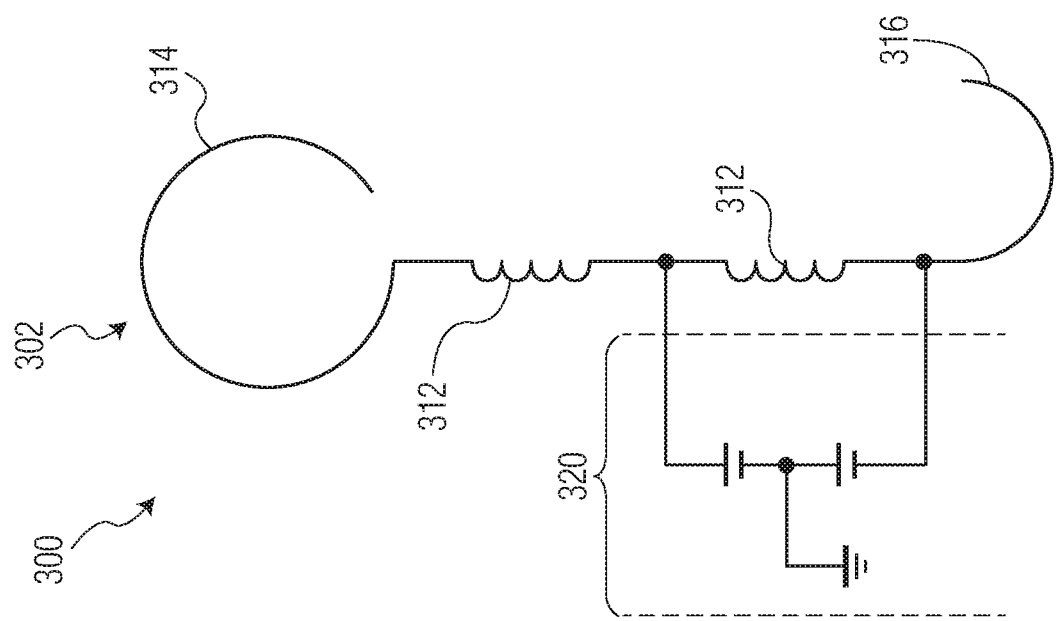

FIGS. 3A and 3B show a second example wireless device 300 including an NFEMI antenna. In this example embodiment, the wireless device 300 is also an earbud that in use may be partially or completely covered, such as when in an earbud placed in a user's ear canal. FIG. 3A is an example circuit view 302 of the wireless device 300 and FIG. 3B is an example side view 304 of the wireless device 300.

The device 300 includes a non-planar outer surface 305 having a core region 306 and an extension region 308, a loudspeaker (not shown), a user interface (not shown), a dual coil antenna 312 (i.e. magnetic H-Field antenna), a first conductive antenna surface 314 (i.e. electric E-Field antenna), a second conductive antenna surface 316 (i.e. electric E-Field antenna), a battery (not shown) and electronic circuitry 320.

The core region 306 is this alternate example also houses various circuit and antenna components as shown in FIG. 3A. The extension region 308 defines part of the non-planar outer surface 305 of the wireless device 300 and is contoured to snugly fit the non-planar surface of a host conductive surface (e.g. a user's ear, so as to provide a stable positioning of an earbud embodiment of the wireless device 300).

In this example, a distance (d) between the first conductive antenna surface 314 and the second conductive antenna surface 316 is maximized due to a diagonal distance between the two surfaces 314, 316 as shown in FIG. 3B. Thus a larger electrical field is generated and Vrx further increases.

Figure 4:
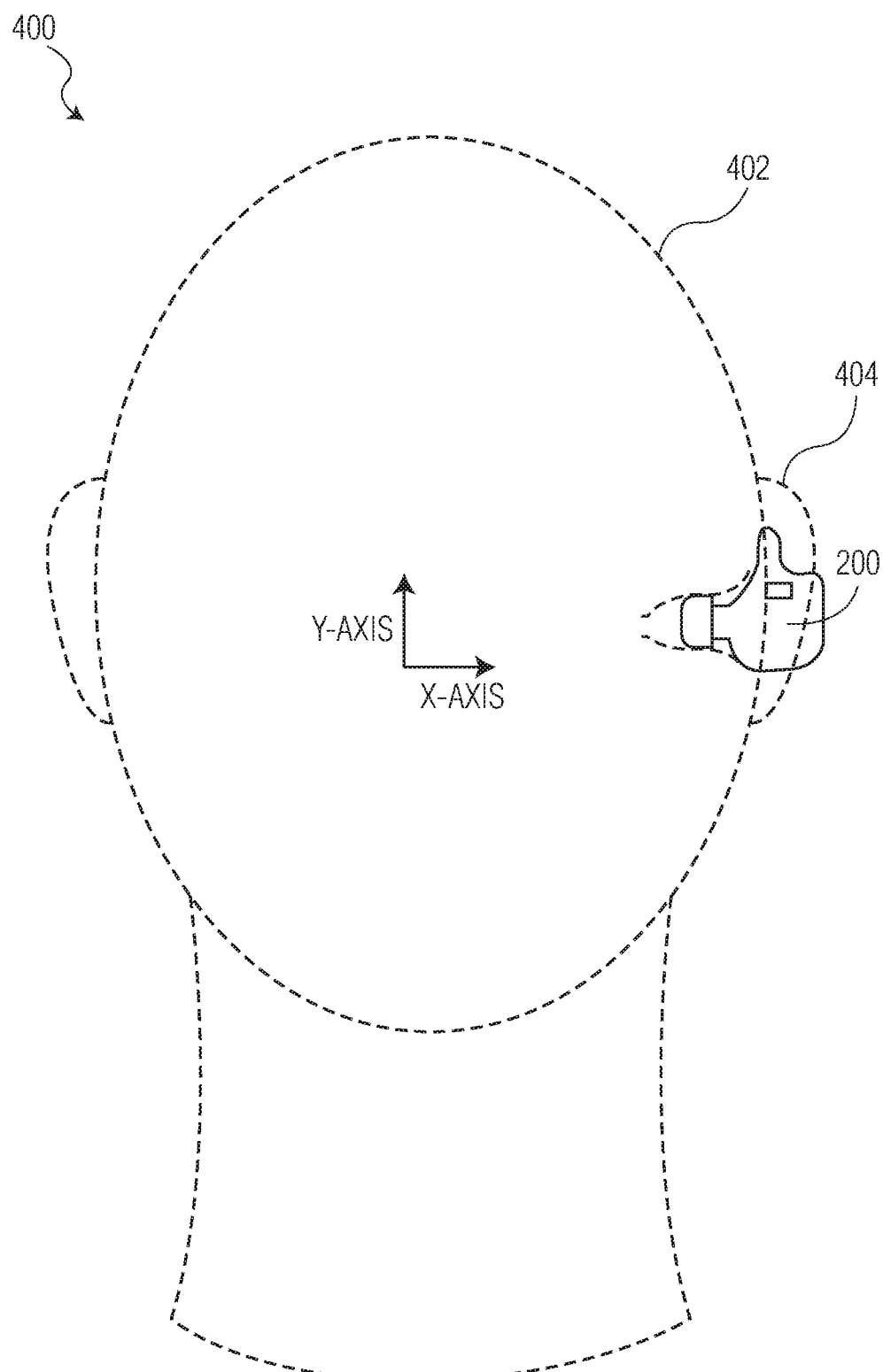
FIG. 4 is an example pictorial diagram of the first example wireless device positioned in a user's ear.

FIG. 4 is an example pictorial diagram 400 of the first example wireless device 200 positioned in a user's 402 ear 404. The loudspeaker 209 is inserted in the user's 402 ear canal. The first conductive structure 214 is fitted in the inner ear while the second conductive structure 216 is positioned separated away from the inner ear.

This configuration of the conductive structures 214, 216 provides a combination of close skin contact with the host and a maximum separation between the two conductive structures 214, 216.

Figure 5:
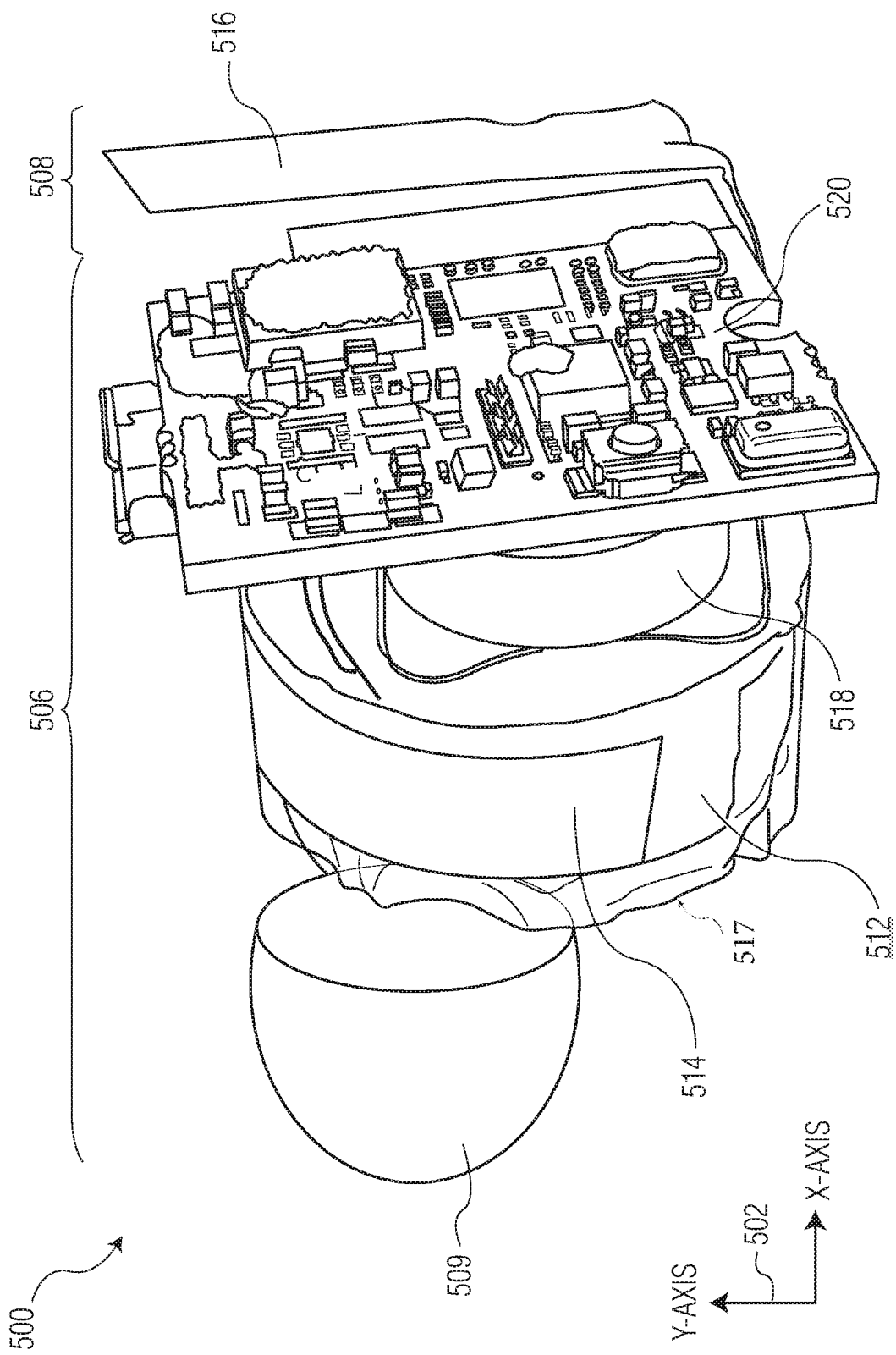
FIG. 5 is a third example wireless device including an NFEMI antenna.

FIG. 5 is a third example (e.g. prototype) wireless device 500 including an NFEMI antenna. In this example embodiment, the wireless device 500 is an earbud that in use may be partially or completely covered, such as when in an earbud placed in a user's ear canal. An example side view 502 of the wireless device 500 is shown.

The device 500 includes a core region 506 and an extension region 508, a loudspeaker 509, a user interface (micro-USB port at top), a coil antenna 512 (i.e. magnetic H-Field antenna), a first conductive antenna surface 514 (i.e. electric E-Field antenna), a second conductive antenna surface 516 (i.e. electric E-Field antenna), a dielectric layer 517, a battery 518 and electronic circuitry 520.

Since the wireless device 500 is not packaged, a non-planar outer surface is not shown. When packaged, the first and second conductive antenna surfaces 514, 516 could be conformed to the non-planar outer surface of the package.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field electromagnetic induction (NFEMI) device configured to be coupled to a non-planar conductive host surface such as a user's ear, comprising:
   a coil antenna portion configured as a magnetic near-field antenna; and
   a first conductive antenna surface configured as an electric near-field antenna;
   wherein the first conductive antenna surface geometrically conforms to a shape of the user's inner ear;
   a second conductive antenna surface configured as part of the electric near-field antenna;
   wherein the second conductive antenna surface geometrically conforms to a shape of the user's outer ear; and
   wherein the device is embedded in an earbud and the first conductive antenna surface forms an outside surface of the earbud.

2. The device of claim 1:
   wherein the geometrical conforming of the conductive antenna surface is configured to increase a capacitance of the electric field antenna which increases a signal strength of the NFEMI antenna.

3. The device of claim 1:
   wherein the non-planar host surface is a human body surface.

4. The device of claim 1:
   wherein the non-planar host surface is an ear surface.

5. The device of claim 1:
   wherein an entire surface area of the conductive antenna surface conforms to the non-planar host surface.

6. The device of claim 1:
   wherein the conductive antenna surface is rigid.

7. The device of claim 1:
   wherein the first conductive antenna surface is configured to be in direct galvanic contact with the user's ear.

8. The device of claim 1:
   further comprising a dielectric layer;
   wherein one side of the dielectric layer is coupled to the conductive antenna surface and an opposite side to the one side is configured to be in direct contact with the non-planar host surface.

9. The device of claim 1:
   wherein the first and second conductive antenna surfaces are substantially centered about an axis perpendicular to the non-planar surface.

10. The device of claim 9:
    wherein the first location and the second location are separated by a longest possible distance on the device.

11. The device of claim 1:
    wherein the first and second conductive antenna surfaces are substantially diagonal to an axis perpendicular to the non-planar surface.

12. The device of claim 1:
    wherein the first conductive antenna surface is coupled to a first location on the device and the second conductive antenna surface is coupled to a second location on the device.

13. The device of claim 1:
    wherein the second conductive antenna surface is planar.

14. The device of claim 1:
    further comprising a user interface.

15. The device of claim 14:
    wherein the second conductive antenna surface encircles the user interface.

16. The device of claim 1:
    wherein an increase in the distance between the first conductive antenna surface and the second conductive antenna surface is configured to increase a signal strength of the NFEMI antenna.

17. The device of claim 1:
wherein the near-field electromagnetic induction (NFEMI) device is configured to operate at near-field frequencies at or below 50 MHz.

18. The device of claim 1:
wherein the first conductive antenna surface and the second conductive antenna surface together form a short loaded dipole near-field electric antenna.

19. A near-field electromagnetic induction (NFEMI) device configured to be coupled to a user's ear, comprising:
   a coil antenna portion configured as a magnetic field antenna; and
   a conductive antenna surface configured as an electric field antenna;
   wherein the conductive antenna surface is configured to geometrically conform to the user's ear;
   wherein the conductive antenna surface is configured to be in direct galvanic contact with the user's ear;
   wherein the device is embedded in an earbud and the conductive antenna surface forms an outside surface of the earbud; and
   wherein the device is embedded in an earbud and the conductive antenna surface forms an outside surface of the earbud.

20. A near-field electromagnetic induction (NFEMI) device configured to be coupled to a non-planar conductive host surface such as a user's ear, comprising:
   a coil antenna portion configured as a magnetic field antenna; and
   a first conductive antenna surface configured as an electric field antenna;
   wherein the first conductive antenna surface geometrically conforms to a shape of the user's inner ear;
   a second conductive antenna surface configured as part of the electric field antenna;
   wherein the second conductive antenna surface geometrically conforms to a shape of the user's outer ear; and
   wherein the first and second conductive antenna surfaces are substantially diagonal to an axis perpendicular to the non-planar surface.

* * * * *